UNITED STATES PATENT OFFICE.

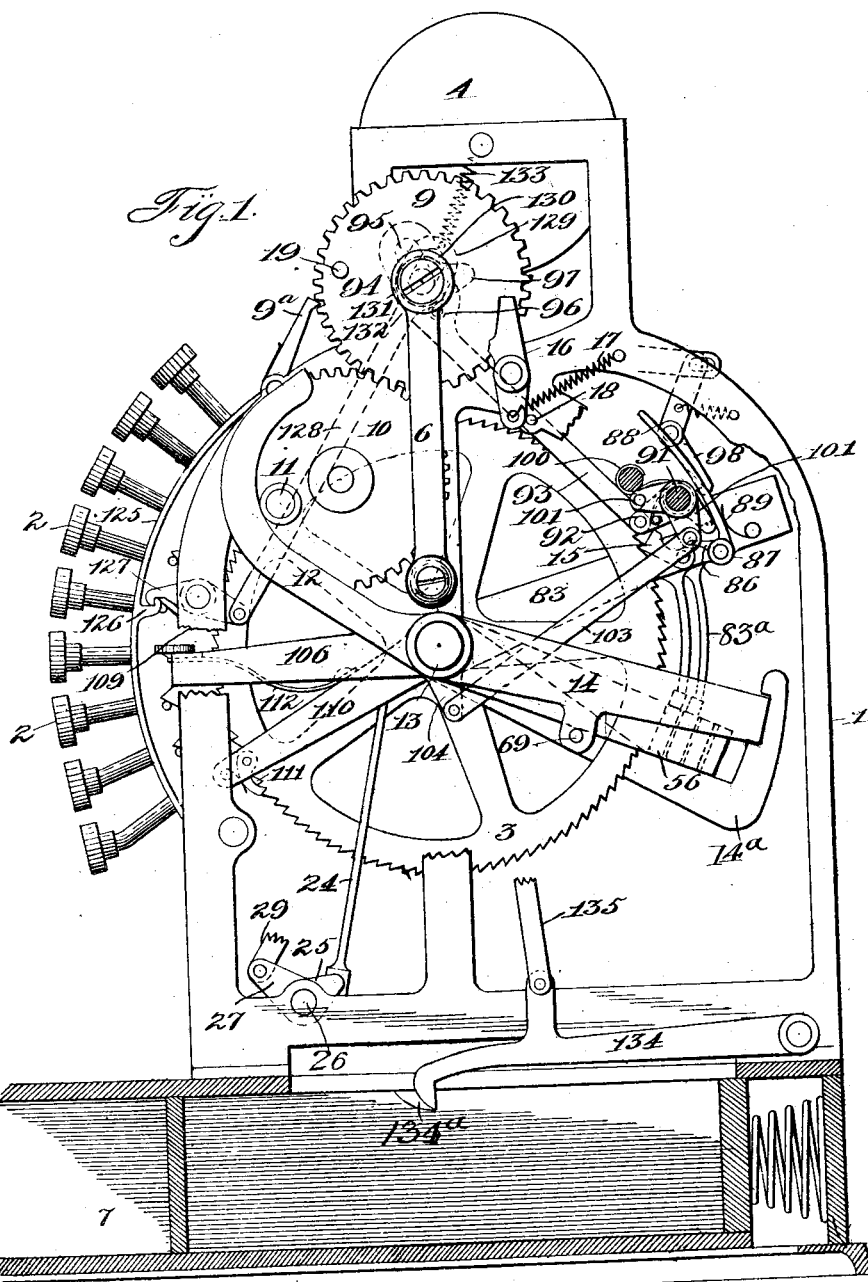

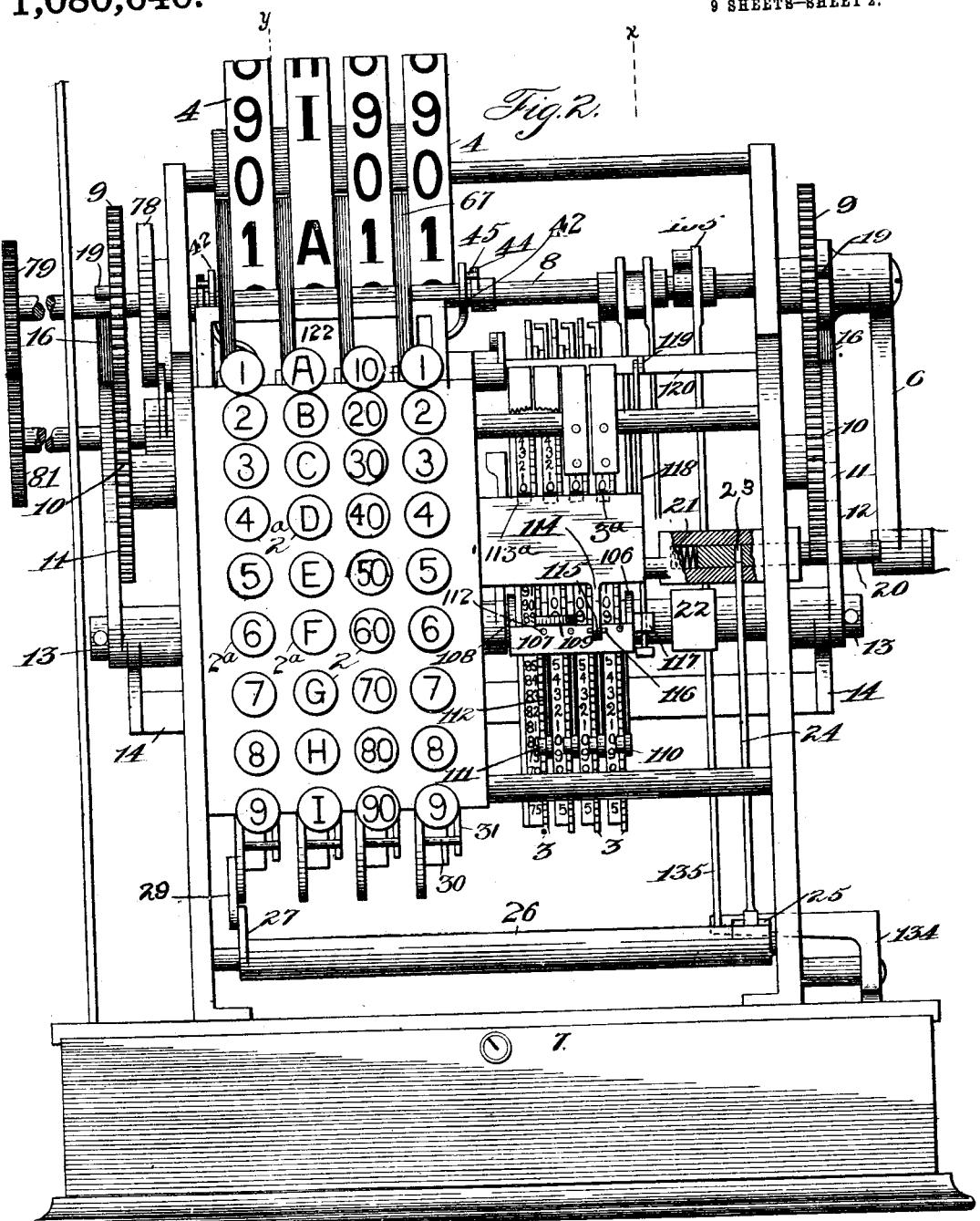

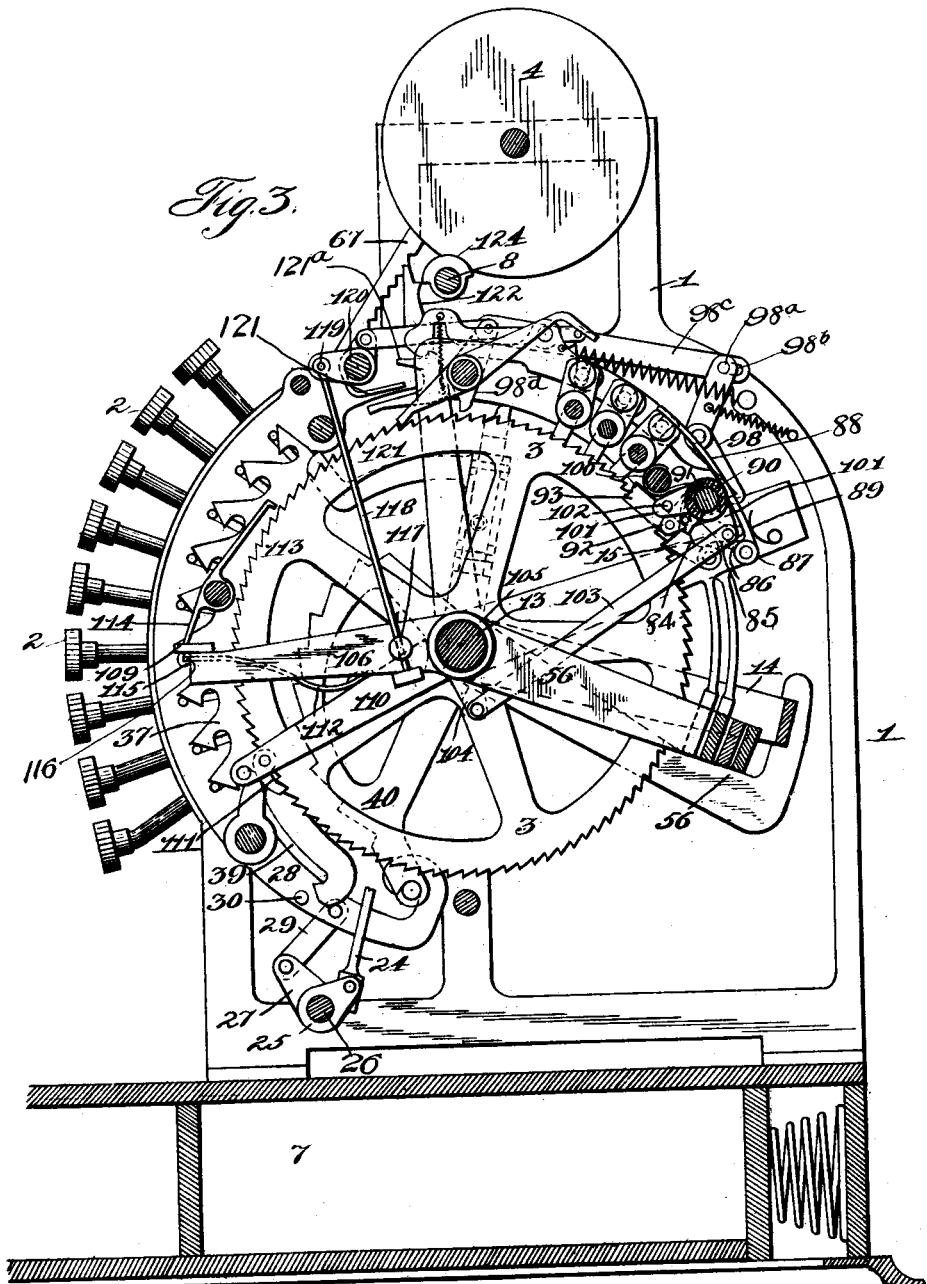

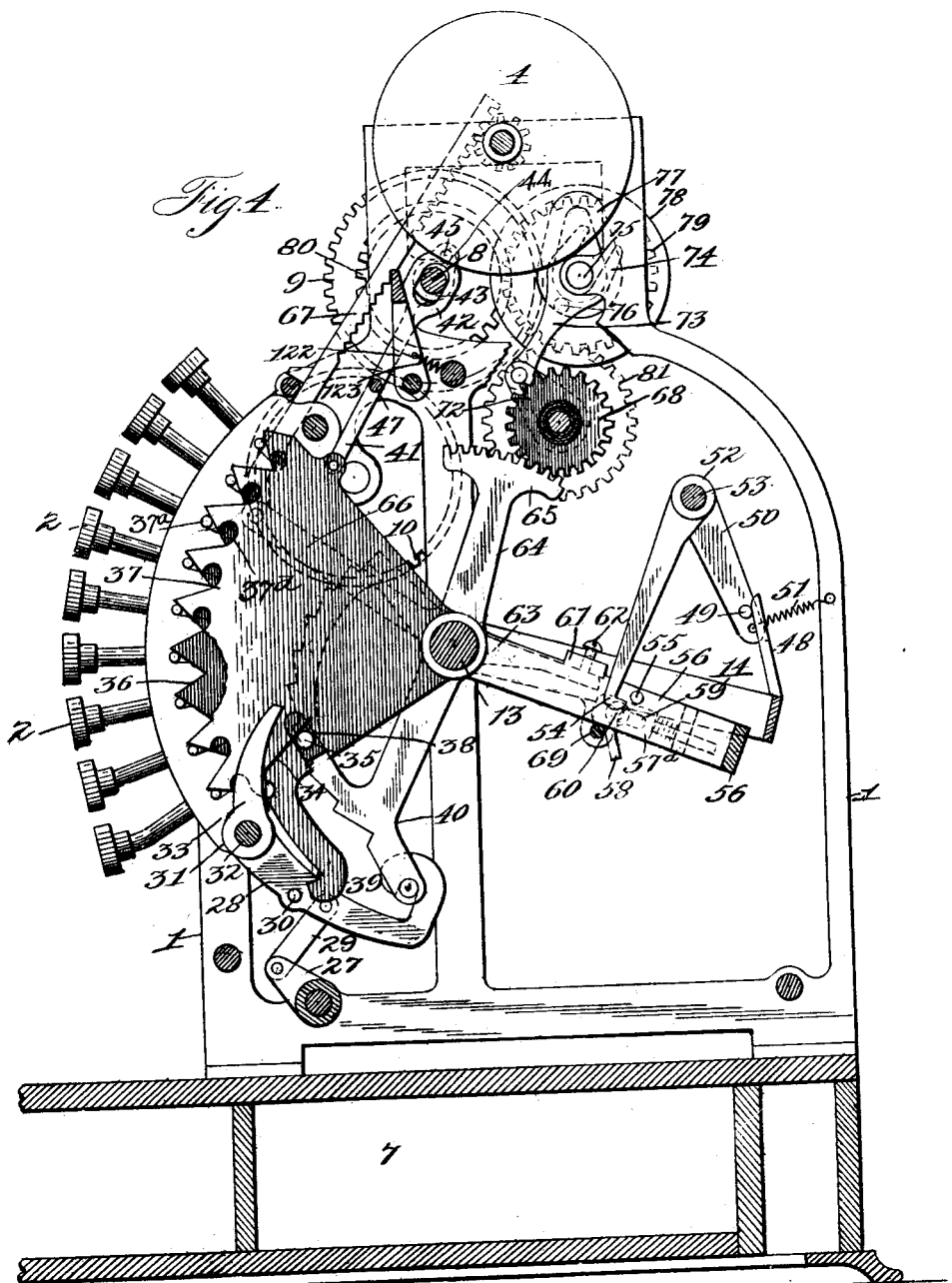

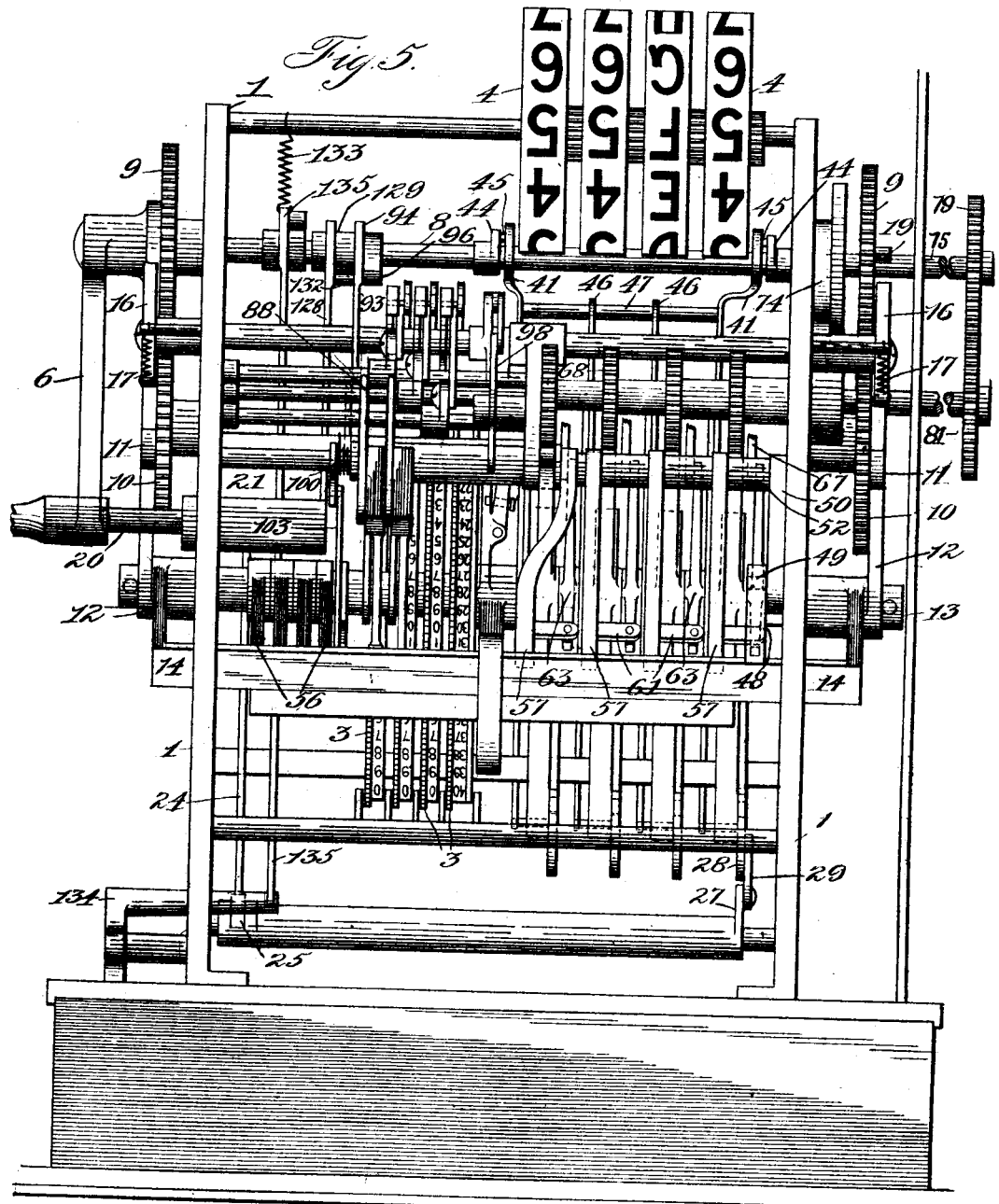

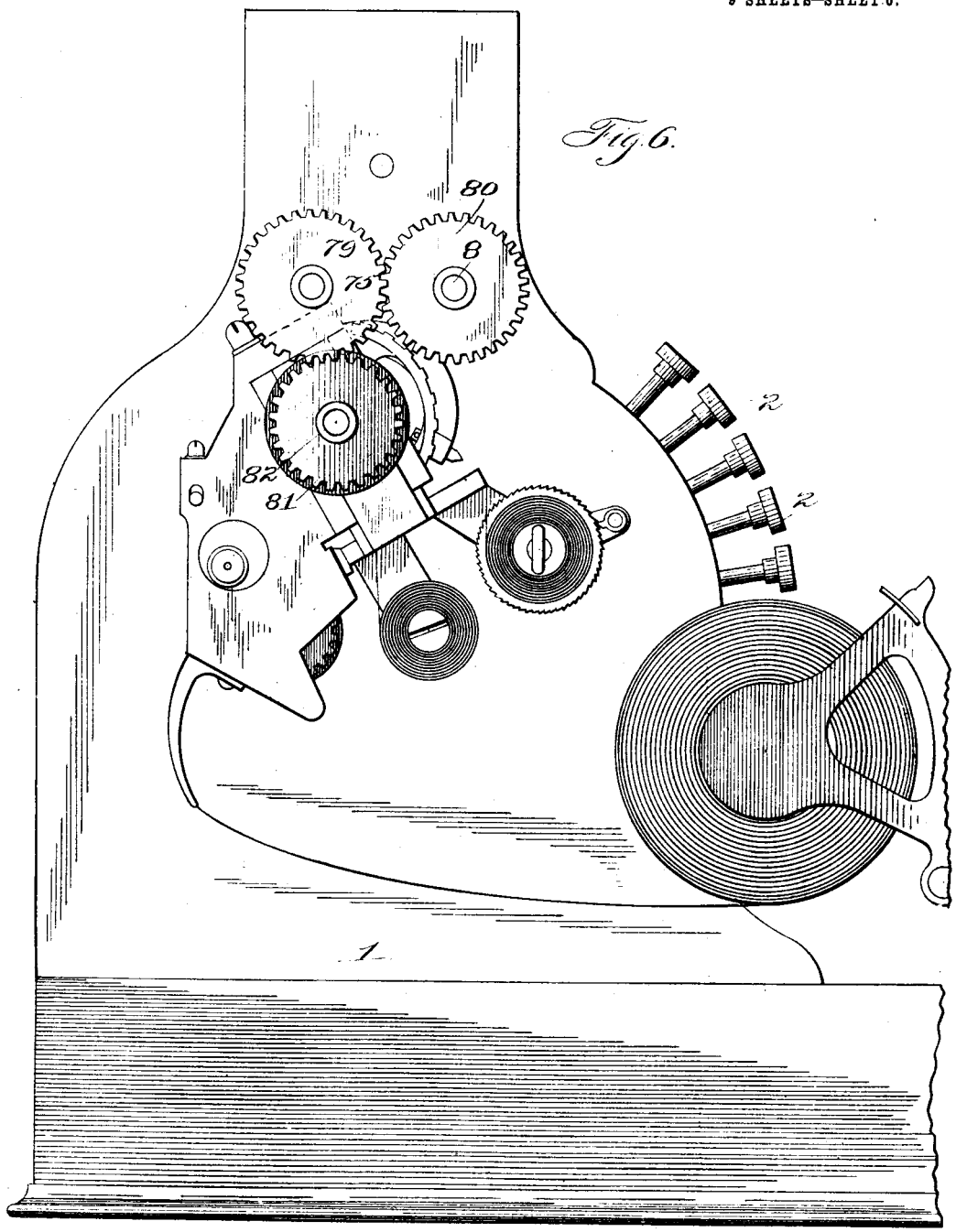

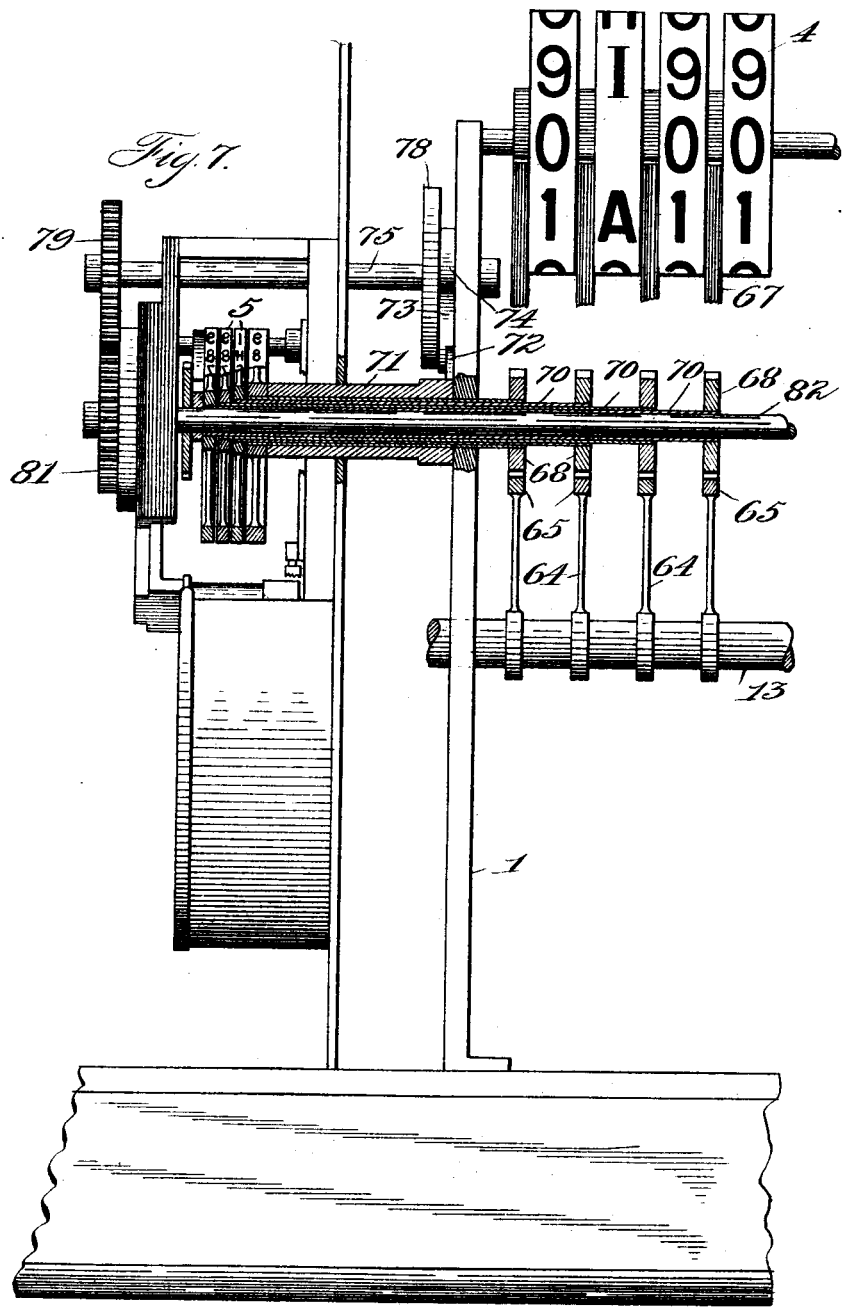

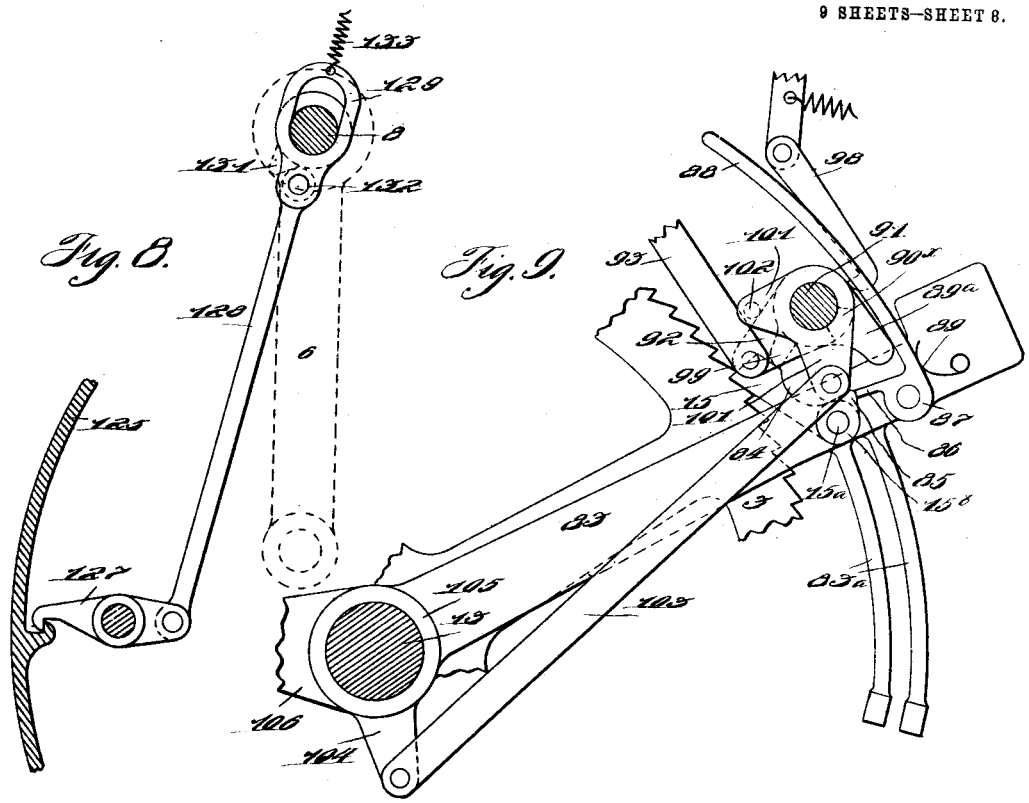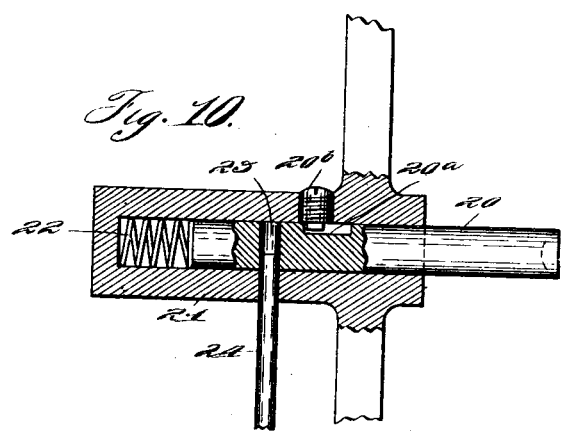

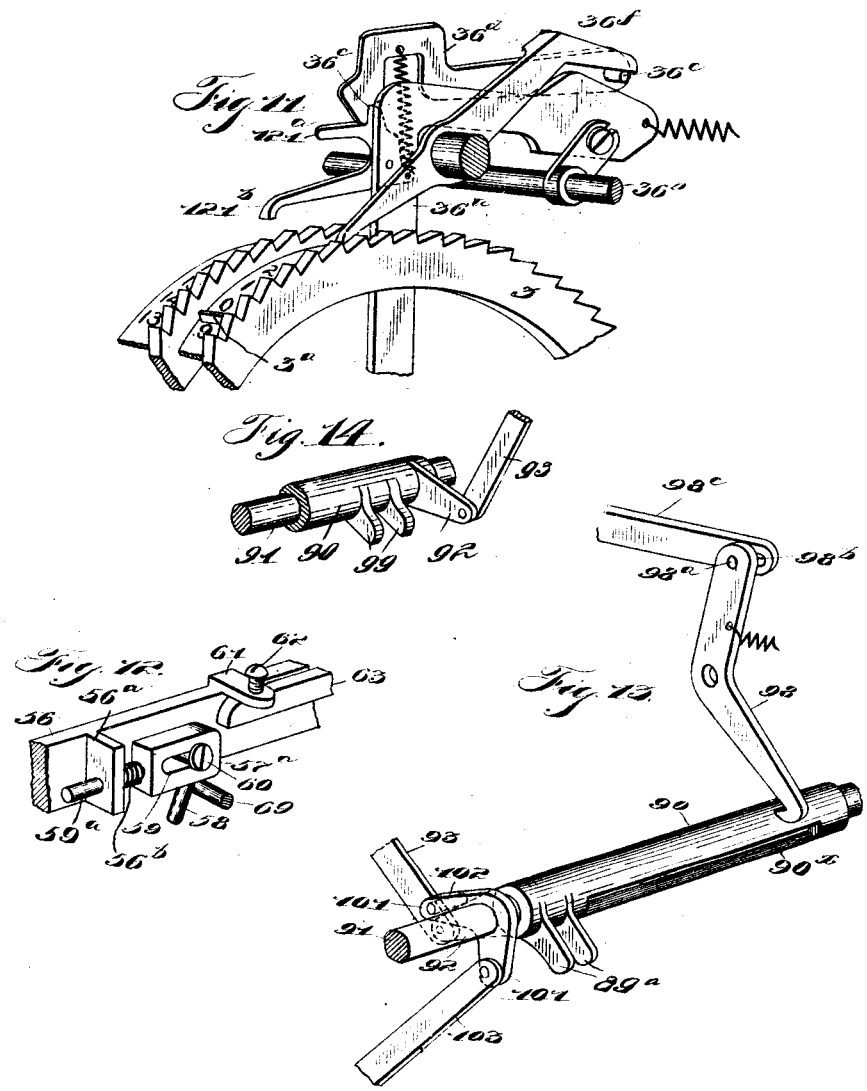

JOHN H. McCORMICK, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

1,080,646.  Specification of Letters Patent.  Patented Dec. 9, 1913.

Application filed December 30, 1897. Serial No. 664,602.

*To all whom it may concern:*

Be it known that I, JOHN H. McCORMICK, a citizen of the United States, residing at Dayton, in the county of Montgomery and State of Ohio, have invented certain new and useful Improvements in Cash-Registers; and I do hereby declare the following to be a full, clear, and exact description of the invention.

This invention relates to improvements in cash registers and indicators and has more particular relation to the type of machine patented to me October 27, 1896 and numbered 570,141.

One of the several objects of my present invention is to provide improved means in a machine of the class mentioned for operating the registering and indicating mechanisms by means of a hand crank lever.

Another object is to provide a check printing attachment for the type of machine mentioned.

Another object is to provide a machine of the class shown with an improved turn to zero device.

A further object is to provide improved locking devices for preventing overthrow of the registering wheels of the type of machine shown.

In the accompanying drawings forming part of this specification: Figure 1 represents an end elevation, partly in section, of the devices embodying my invention, applied to a machine of the class mentioned; the cabinet being removed. Fig. 2 represents a front elevation of the same, partly broken away and partly in section. Fig. 3 represents a vertical transverse section through the machine taken on the line *x—x* of Fig. 2. Fig. 4 represents a similar view taken on the line *y—y* of Fig. 2. Fig. 5 represents a rear elevation of said machine. Fig. 6 represents an end elevation of the machine, the printing mechanism casing and a portion of the printing mechanism being omitted for clearness. Fig. 7 represents a detail front elevation, partly in section, of a portion of the printing and indicating devices. Fig. 8 represents an enlarged detail side elevation of the locking device and connections for the hinged register cover or shield. Fig. 9 represents an enlarged detail side elevation of one of the operating pawls for the register wheels and its coöperating devices. Fig. 9ᵃ represents a detail front elevation of one of the locking pawls and its latch. Fig. 10 represents an enlarged detail central vertical section of the locking plunger for the operating handle. Fig. 11 represents an enlarged detail perspective view of one of the transfer pawls, its operating devices and the adjacent portions of the two registering wheels. Fig. 12 represents an enlarged detail perspective view of the indicator release slide. Fig. 13 represents an enlarged detail perspective view of the pawl locking sleeves, its latch and coöperating devices, and Fig. 14 represents a detail perspective view of a part of the frame shown in Fig. 13, but taken from the opposite side.

As a large number of the parts shown in connection with my present improvements are already patented I will not enter into a detail description of such parts here but will refer to the aforesaid patent for a description of the same.

In the said drawings 1 represents the main frame of the machine; 2 the amount keys; 2ᵃ the special keys; 3 the registering wheels; 4 the indicating wheels; 5 the check printing segments and 6 the operating crank handle.

The frame 1 and the sliding cash drawer 7 mounted in the bottom of the same, are substantially similar to the frame and cash drawer described in the patent mentioned with the exception that the drawer is adapted to be operated independently of the working parts of the machine so that the latter are unaffected by its movements, and said working parts are actuated, in lieu of their usual connection with said drawer, by means of the crank hand lever 6 which is rigidly mounted upon a transverse crank shaft 8. This shaft carries two gear wheels 9 mounted at the opposite ends of the same as shown in Fig. 2 but as said gears and their coöperating parts are similar in each case I will describe the right hand group only as this description will suffice for both. This right hand gear wheel 9 meshes with a similar gear wheel 10, journaled on the frame 1 (see Fig. 1) and is provided, on one side, near its periphery with an anti-friction roller 11, which is adapted to engage a curved operating arm or lever 12 journaled on the main shaft 13 of the machine. It will be readily seen that by this peculiar structure the lever 12, which is connected rigidly to one end of the main operating yoke 14, of the machine, will be alternately forced downward, and then permitted to ascend upon the operation of the wheel 10 thus carrying said yoke with it. The peculiar curved formation of said lever permits of a partial movement of said roller 11 while in contact with said lever without moving the latter which structure is necessary in order to permit the handle 6 to move independently of the lever 12 after the movement of the latter is complete and thus operate the parts which must receive motion subsequent to the movement of said lever.

The yoke 14 which extends from end to end of the machine as shown in Fig. 5 is fast to an arm 14ª pivoted on the shaft 13; which arm is adapted to actuate the operating yokes 56. These yokes are arranged to operate the pawl carrying levers 83 hereinafter described through the medium of curved arms 83ª pendant from said levers and resting upon said yokes. A spring pressed pawl 9ª (see Fig. 1) is mounted upon the main frame and engages the gear teeth of the wheel 9 in such manner as not to interfere with the forward movement of said wheel but effectually prevents all backward movement of the same. It will be borne in mind that any straining of the yoke 14, is prevented by the aforesaid duplicate means for actuating the same from both ends.

In machines of the class of the present invention it is absolutely essential that the several working parts should have positive full movements without intermediate retrograde movement. In other words, the yoke 14, must fully descend before being again raised or the operating pawls 15, the movements of which are effected by said yoke, will not operate to move the registering wheels sufficiently to insure the registration of the full amount. To compel full strokes of the parts I therefore pivot a stop lever 16 upon each side of the frame 1, and provide each of the same with a coil spring 17 also secured to the frame so as to normally draw the lower end of the lever against a stop pin 18 mounted upon the frame (see Fig. 1). The gear wheel 9 in each instance is provided with a stop pin 19, so located as to strike the top of its lever 16 when the wheel is rotated and said lever 16 is in its normal position. Should the handle 6 be moved with such rapidity that the pin 19 reaches the end of the lever 16 before the latter is forced backward by the end of its respective lever 12 striking it, the crank lever will be arrested thereby and held locked against further rotation until the said lever 12 has made its full upward stroke and engaged and forced the lever 16 back out of the path of the pin 19. The levers 12 are forced upward when relieved of the pressure of the rollers 11 by the descent of the yokes 14 and 56 connected thereto; said yokes moving downward by gravity. By the above means, I secure a positive guard against any insufficient movement of the registering wheels because of the rapidity of movement of the operating crank handle. When the said crank handle has made one complete revolution it is brought to a stop by a stop pin or plunger 20 which operates in a socketed block 21, fast upon the frame (see Figs. 2 and 10). The pin is beveled at its outer end as shown in Fig. 5 and is loosely mounted in said block so that it may be normally forced forward by a coil spring 22, also mounted in said block. Said pin is also formed with a transverse passage 23, into which the end of a locking rod 24 normally projects so as to lock the pin with its projecting end in the path of the handle. The plunger 20 is further formed with a groove 20ª (see Fig. 10) into which projects the end of a screw 20ᵇ mounted in the casing 21, for limiting the movements of said plunger. The said rod 24 is connected at its lower end to an arm 25 (see Fig. 1) mounted upon a transverse rock shaft 26, the latter being suitably journaled in the frame 1, and also provided with an arm 27, extending at an angle to the first mentioned arm. This arm 27 is connected to the hook bar 28 of the outermost special key bank (see Fig. 4) by a pivoted link 29 so that said bar and arm will move simultaneously. It will be seen from the above that, when the said hook 28 is raised by the operation of a key in said bank as hereinafter more fully described, the rod 24 will be drawn downward and thus release the plunger 20 so that the same is left free to be forced inward by the crank handle engaging and passing its beveled end. This structure compels an operation of a key in the said special bank before the machine can be operated. The said hook bar 28 is substantially like those described in said patent and is provided with a laterally projecting pin 30 and a journal portion 31 which latter is mounted loosely upon a transverse journal shaft 32. The journal portion is formed at one end with an arm 33 carrying a flat spring 34, which engages a pin 35 mounted on the toothed segment 36 of the outermost special key bank; the detent plate or detent 37 of said bank being slotted as at 38 to allow said pin to project through it. A hook arm 39 is pendant from the said detent plate 37 and forms a stop or lock for the hook 28 by projecting into the path of the pin 30. When one of the keys of the said special bank is operated both the segment 36 and the detent plate 37 are forced upward by the pin 37ª of said key engaging the inclined walls of the notches formed in said segment and plate. As the segment and detent move upward the arm 39 still continues to block the path of the pin 30, and the pin 35 simultaneously, puts the spring 34 under tension so that when the detent 37 is allowed to descend below its normal position by the pin of the key passing into one of the notches 37ᵈ of said plate, the said arm 39 will drop below the pin 30 and the hook 28 will be raised by the tension of said spring 34. This raising of the hook 28 releases the graduated segment 40 so that it may rise with its respective auxiliary yoke 56 when the crank handle is operated and simultaneously releases said handle through the mechanism above described. These segments 40 are fast to and move with the yokes 56 and are limited in their movements by the projecting ends of the operated keys which form stops against which the graduated portions of said segments abut substantially as described in said patent. These locking devices which have been described in connection with the special bank are duplicated on all the remaining banks so that the keys of the same are locked against any partial operation.

The office of the peculiar constructions above mentioned is to prevent any operation of any one of the frames 40 before a key in its particular bank has been forced in the full extent of its movement. Should a key be forced inward only through a portion of its movement the arm 39 of its respective bank will stand in the path of the pin 30 and hold the hook 28 firmly against any movement to release the segment 40, but just as soon as the key is forced fully in, the detent 37 descends and unlocks the said hook 28 as before described. It will be observed that each detent 37 locks the operated keys in their inner positions and in order to raise the detents and release the keys I provide each of said detents with an operating bar 41 pivotally connected thereto. Each of the right and left hand bars is provided at its upper end with an enlargement or head 42, having an elongated slot 43, formed therein. The crank shaft 8 passes through said slot and is provided with a cam 44 adapted to engage a pin 45 projecting from the top of the head 42, and thus raise the bar 41 (see Fig. 4.) The said right and left hand bars 41 are connected by a cross bar 47 (see Fig. 5) which bar is in turn connected to the intermediate detents 37 by pivoted links 46 so that when said bars 41 are raised all of the detents are simultaneously raised to release the keys during the last portion of the movement of the crank handle. It will of course be understood that all of the bars 41 may be extended to coöperate with cams upon the shaft 8 so that each of the detents connected thereto will be independently moved; or the respective bars 41 shown in the drawings may be connected to the detents by slot and pin connections so that the detents will be able to have an individual movement. As similar constructions are old and well known in the art, no further description or illustration of the same is thought necessary here. In the present instance I have illustrated the detents as coupled together so as to all move simultaneously. With this construction it is of course necessary to press the desired keys simultaneously.

The main operating yoke 14, heretofore described is provided at one end with an upwardly projecting tripping arm 48 (see Figs. 4 and 5) having an inclined upper end adapted to contact with a pin 49 mounted on a bell crank lever 50 to operate the latter against the tension of a coil spring 51, which connects it with the main frame. Said bell crank is rigidly mounted upon a sleeve 52 journaled upon a shaft 53 and has one of its arms formed with a hook 54 which is adapted to catch over a pin 55 projecting laterally from one of the auxiliary operating yokes 56 which latter are connected to the respective segments 40 as fully described in the patent mentioned. The said sleeve 52 is further provided with a plurality of hook arms 57 similar to the hook arm of the bell crank and adapted to catch over pins similar to the pin 55 and mounted on the respective auxiliary yokes. It will be seen from the above that when the crank handle is operated and the yoke 14 allowed to descend together with the auxiliary yokes which have been released by the keys, that the remaining auxiliary yokes which have not started to descend with the main yoke are positively locked in their elevated positions and cannot be released by the keys until the main yoke 14 has been again raised and the bell crank lever 50 operated to move the supporting hooks away from the pins 55. After the initial movement of the crank handle all movement of the unoperated auxiliary yokes is thus effectually prevented and the devices protected against any tampering or dishonest manipulation. Each of the before mentioned auxiliary yokes 56 is also provided with a spring pressed locking slide 57ᵃ (see Fig. 12) formed with a pendant inclined arm 58, an elongated guiding slot 59 and a guiding stem 59ᵃ. A pin 60 mounted on the yoke 56 projects through the slot 59 formed in the slide while the stem 59ᵃ projects through an apertured guiding lug 56ᵃ also mounted on said yoke; a coil spring 56ᵇ being mounted on the stem between the lug and slide. The yokes 56 are each further provided with a laterally projecting arm 61 in which is mounted an adjustable stop screw 62 for limiting the movement of one of a series of levers 63 pivotally mounted upon the main shaft 13. Each of said levers 63 is provided with a graduated stop segment and projecting arm 64 formed with a segmental rack 65, and an arm 66 to which is pivotally connected the respective rack bar 67 of one of the indicator operating wheels (see Fig. 4). The said segmental racks 65 of the respective levers 63 mesh with their respective gear wheels 68 of the check printing device. The side arms of the yoke 14 are connected by a transverse bar 69 which is so located in relation to the inclined arm 58 of the slides 57ª as to engage the same, upon said yoke being raised and thus move the sliding blocks 57 rearward from under the arms 63. When the yoke 14 descends with the auxiliary yokes that have been released the slides 57ª remain in normal position until an auxiliary yoke is stopped by an operated key in its respective bank when the continued downward movement of the main yoke disengages the rod 69 from the arm 58 of the slide of the arrested yoke and permits said slide to be forced forward by its spring under the arm 63 of said yoke to lock the same to the yoke and prevent overthrow. As the yoke 14 again rises the rod 69 engages the arms 58 and moves the blocks 57 rearward to allow the auxiliary yokes to rise without the levers 63 and thus leaves the indicators and check printing devices in their set positions to which they have been adjusted upon the down stroke. Each of the said segmental racks 65 as above described engages one of the gear wheels 68 of the check printer so that when any one of the said racks is operated its corresponding gear is also turned to an equal extent to operate its printing segment 5. The said segments are connected to their respective gear wheels 68 by sleeves 70 mounted loosely one upon the other so that they are free to rotate independently of each other in a manner well known in the art.

The construction and operation of the check printing devices shown in connection with this invention are substantially the same as the check printer included in the patent to Cleal and Reinhard, No. 580,378, April 13, 1897, and I will therefore refer to such patent for a detail description of its construction and operation. A supplemental sleeve 71 (see Fig. 7) is mounted loosely upon the outermost sleeve 70 and is provided with an arm 72 to the outer end of which is pivotally connected an operating yoke lever 73 shown in Fig. 4. The yoke end 74 of this lever embraces a shaft 75 while a laterally projecting pin 76 mounted on said lever projects into a cam slot 77 formed in a wheel 78 fast upon the said shaft 75. The sleeve is suitably connected to the inking devices of the check printer for operating the same in the same manner as described in the said patent to Cleal and Reinhard. The shaft 75 which carries the operating cam groove wheel receives its motion from a gear wheel 79 fast thereon and meshing with a gear wheel 80 mounted upon the crank shaft 8. The said gear 79 further meshes with a gear wheel 81 fast to the outer end of the shaft 82 which supports the sleeves 70, and thus imparts the necessary motion to said shaft for operating the sliding platen and the check ejector, which are also of the construction and operation shown in the last mentioned patent.

By reference to Figs. 6 and 7 it will be seen that the printing segments will print a clerk's number corresponding to the operated key of the first special bank and also a department letter corresponding to the operated key in the second special bank as well as the selected amounts of the two amount banks. Each of the toothed register wheels 3 is adapted to be operated by the before mentioned pawls 15 which latter are fast to short shafts 15ª journaled in the outer ends of levers 83 in turn journaled upon the main shaft 13. Each of the said pawls 15 is formed with a recess as at 84 and is mounted upon one end of its shaft 15ª (see Figs. 9 and 9ª); the opposite end of the shaft having a collar formed with a stop nose or projection 85 adapted to be engaged by one arm 86 of one of a series of bell crank levers 87 pivoted on the respective levers 83. The remaining arm 88 of each of said bell crank levers is curved as shown in the drawing and is normally forced forward by a spring 89 mounted on the lever 83 so as to cause the arm 86 to normally engage the nose 85 and hold the pawl locked in engagement with the register wheel. The pawls are unlocked to allow the levers 83 to descend by arms or fingers 89ª mounted upon a locking sleeve 90 which is loosely mounted upon a transverse shaft 91; said arms forcing the arms 88 rearward and thus disengaging the arms 86 from the noses 85 (see Fig. 13). The said sleeve 90 is operated to cause this disengagement of all of the pawls by an arm 92 with which it is provided and which is pivotally connected to the lower end of a bar 93 formed at its upper end with an enlarged head 94 having an elongated slot 95 (see Fig. 1). A laterally projecting pin 96 is mounted upon the bar 93 and is adapted to be struck by a nose 97 fast on the crank shaft 8 which passes through the said slot 95 to form a guide for the said bar 93.

It will be seen from the above that when the crank handle is operated the bar 93 is forced downward thus rotating the sleeve 90 and operating all of the bell crank levers 87 to release the pawls 15. As each of the levers 83 drops, the arms 88 of its respective bell crank lever continues to bear upon its respective finger 89ª and thus holds the arms 86 out of engagement with the nose 85 until said lever 83 has reached its lowermost position. The said arms 89ª are held to engagement with the bell crank levers until the levers 83 have reached their lower positions by a bell crank catch lever 98 adapted to engage the walls of a groove 90ˣ formed in said sleeve 90. This catch lever is provided at its upper end with a pin 98ª (see Fig. 13) which projects into a slot 98ᵇ formed in a link bar 98ᶜ which is in turn connected to a pivoted trip 98ᵈ (see Fig. 3). This trip is adapted to be operated by a trip arm 98ᵉ fast to and moving with the lever 14ª so that when the lower end of the stroke is reached the arms 88 are released by the release of the sleeve 90 and the noses 86 again engage the noses 85 and thus lock the pawls to the wheels; said noses 86 being forced forward by the springs 89. The said sleeve 90 is further provided with a plurality of noses or projections 99 (see Fig. 14) adapted, when in their normal positions to be struck by the pawls 15 when the latter are moved upward and thus jam said pawls against their respective register wheels and form an additional means for preventing said wheels being overthrown, no matter how violently the machine is operated. The pawls are thus locked fast to the wheels and the levers carrying said pawls are positively stopped by striking against any suitable stationary portion of the frame. When the sleeve 90 is rotated upon the initial movement of the crank handle the said noses 99 are disengaged from the pawls and moved so as to extend into alinement with the recesses 84 so that when the said pawls move backward the noses may enter said recesses and not interfere with the movements of the pawls. The said sleeve 90 is held in its normal position by a coil spring 100 which is connected thereto and to any suitable portion of the frame so that any rotation of said sleeve will put said spring under tension to return the sleeve upon the same being released.

As it is necessary in returning the registering wheels to zero, to unlock the pawls 15 and allow them to disengage from the registering wheels without operating the crank handle, I journal a bell crank lever 101, on the shaft 91 and provide the same with a laterally projecting pin 102 which normally rests upon the upper edge of the arm 92, (see Fig. 13). It will be seen that by this structure the arm 92 may operate without affecting the bell crank lever 101 but any movement of the latter will immediately depress said arm. The said lever 101 is pivotally connected to a link bar 103 which in turn is connected to an arm 104 formed on a sleeve 105; said sleeve being journaled on the shaft 13 and provided with an operating lever 106, (see Figs. 3 and 9). This lever is located on the shaft 13 to one side of the registering wheels and is connected at its outer end to a cross bar 107 see Fig. 2 which lies in front of the registering wheels and is in turn connected to a lever 108, pivoted upon the shaft 13 to the opposite side of the registering wheels forming in effect an operating yoke. The said bar 107 is provided with a button or key 109 whereby it may be depressed at will to operate the lever 106 and thus release all of the operating pawls as above described. This yoke is also used for turning the counter wheels to zero in connection with a series of levers 110. These levers are journaled on the shaft 13 between the respective register wheels and are provided respectively at their outer free ends with spring pressed pawls 111 which engage the respective register wheels upon the down strokes of said levers 110. These levers are adapted to be depressed to turn the register wheels by a plurality of curved spring arms 112 secured to said levers and projecting through suitable apertures formed in the cross bar 107 (see Fig. 2) to allow the necessary longitudinal movement of the outer ends of said springs when they are depressed.

It will be observed from the above that when the cross bar 107 is depressed the main operating pawls are first unlocked, then as the tension on the springs 112 is increased the registering wheels are rotated by the pressure of said springs upon the levers 110 in the manner aforesaid. Should one of the registering wheels reach its zero point before the remainder and be brought to a stop as hereinafter described, the spring 112 of this particular wheel will be further depressed and thus permit the remainder of the wheels to be further operated and turned to zero, while the said particular wheel remains stationary. The registering wheels 3 are numbered about their peripheries and these numerals are divided into groups of ten numerals each; said divisions being bounded by tripping projections or lugs 3ª as fully described in said patent and as shown in Fig. 11. When the wheels are to be turned to zero, the pivoted spring pressed stop plate 113 see Figs. 2 and 3 is forced inward so that the spaced fingers 113ª which are formed at its upper edge will project into the paths of said projections upon the wheels to arrest the movements of the same when the zero point is reached. A pendant arm 114 is mounted on said stop plate and is formed at its lower end with a hook 115 (see Fig. 3) which is adapted to catch over a projection 116 of the cross bar 107 to hold the latter in its elevated position.

In machines of the type herein described, it is necessary in returning the registering wheels to zero, to disengage both the operating and the transferring pawls therefrom. As the connections for the disengagement of the operating pawls has been before described, I will now describe the connections of the transfer pawls. The aforesaid lever 106 is provided on one side with a laterally projecting apertured stud 117 through which projects a headed rod 118 connected at its upper end to an arm 119 (see Fig. 3). This arm is rigidly secured to a rock shaft 120 upon which is mounted an angular pawl lifting plate 121. The downward movement of the lever 106 will actuate the arm 119 and thus cause the plate 121 to engage and lift the noses 121$^a$ of the transfer pawls 121$^b$ and disengage said pawls from the registering wheels (see Fig. 11). Each of said transfer pawls is mounted upon a pivoted arm 36$^a$; said arms receiving motion from a series of rock shafts 36$^b$ in substantially the same manner as described in said patent with the exception that said operation takes place upon the down instead of upon the up stroke. Each of said pawls is further provided with a lug or projection 36$^c$ which is adapted to be engaged by one of a series of spring pressed pivoted levers 36$^d$ and thus held temporarily in its upper position when elevated. The rear end of each of these latter levers is provided with a pin or stud 36$^e$ which abuts against the under side of one of a series of pivoted levers 36$^f$. These levers are normally held with their free ends in proximity to the registering wheels and in the paths of the projections which bound the sections on said wheels so that when struck and operated by said projections they will cause the transfer pawls to be released to engage the registering wheels to operate the same upon being moved forward by the levers 36$^a$ as above described.

In order to secure the aforesaid indicators 4 in the positions to which they are adjusted, until the succeeding operation of the machine, I provide a rock frame 122 (see Figs. 2, 3 and 4) adapted to engage the teeth formed upon the indicator rack bars 67, upon being forced forward; these bars being of the construction and operation described in said patent. The said frame is normally held out of engagement with the said bars 67 by a coil spring 123 (see Fig. 4) which connects it with the main frame, and is forced forward into such engagement at the proper time by a cam 124 mounted upon the crank shaft 8 (see Fig. 3).

The registering wheels and turn to zero devices are concealed and guarded by a hinged shield 125 (see Figs. 1 and 11) which extends down in front of the same, and is formed with an internal hook 126. This hook is engaged by a pivoted hook 127 suitably mounted on the main frame and pivotally connected to a bar 128, which is provided at its upper end with an enlarged head 129 formed with an elongated slot 130. The crank shaft 8 projects through this slot and is provided with a cam 131, which is adapted to strike an anti-friction roller 132, mounted on the head 129, and thus force the bar 128 downward, (see Fig. 8). It will be seen by reference to this figure of the drawings that the operation of the bar 128 does not take place until the last part of the movement of the crank handle so that the guard 125 is not released to allow access to the turn-to-zero devices until the transfer, from the preceding transaction, has been made on the registering wheels. A coil spring 133 connects the upper end of the head 129 with a portion of the main frame for drawing the bar 128 upward when relieved of the pressure of the nose 131. The drawer 7 is held in its closed position by a pivoted latch 134 which engages a notch 134$^a$ formed therein. This latch is operated by a pivoted bar 135 constructed and operated in substantially the same manner as the bar 128 except that the spring is omitted and the bar is forced up instead of down (see Fig. 2), the latch returning by gravity to its normal position when released.

It will be observed from the foregoing description that the peculiar construction of the levers 12 which are engaged by the rollers 11 upon the wheels 10 permits of the latter being operated after the levers have come to rest as before described. This consecutive operation is essential in a machine of this class as certain portions of the mechanism connected to the operating gears must be operated after the main operating yoke has come to rest.

The following broad subject matter is disclaimed: The combination with an indicator, a register wheel, a pawl for turning said wheel, means for locking said pawl to the register wheel, a device for locking the indicator, and a common means for operating said locking devices.

The devices described for preventing overthrow of the indicators are not herein claimed, they forming the subject matter of Patent #861,237, granted July 23, 1907 as a division of this case.

Having thus described my invention what I claim as new and desire to secure by Letters Patent is:

1. In a cash register of the class described the combination with a registering mechanism, of an indicating device, a printer, operating devices for the register, and pivoted levers connected at their opposite ends to the indicator, and the printer and adapted to be operated by said operating devices.

2. In a cash register of the class described the combination with registering, indicating and printing mechanisms, of operating yokes for said registering mechanism, levers connected to the indicating and printing mechanisms and adapted to be engaged by the said yokes, and locking devices for locking said levers to said yokes during a portion of the movements of the latter.

3. In a cash register of the class described the combination with a register, of a series of keys, a series of pivoted stop segments having step projections and arranged to be limited in their movements by abutting against said keys, a printer and connections between the latter and said stop segments, including intermeshing gearing.

4. In a cash register the combination with a register comprising a plurality of registering wheels, operating levers for said wheels, operating pawls mounted on said levers so as to engage said wheels, operating devices for said levers, racks independent of said devices but arranged to be operated by the same, and a check printing device operated by said racks.

5. In a cash register the combination with a register comprising a plurality of registering wheels, of operating devices for said wheels, indicators, a printer, and means connected to the indicators and printer and arranged to be set by the operating devices and left in said set positions while said devices subsequently operate the registering wheels.

6. In a cash register the combination with a register comprising a plurality of registering wheels, of operating devices for said wheels, a printer and means connected to the printer and arranged to be set by the operating devices and left in said set positions while said devices subsequently operate the registering wheels.

7. In a cash register the combination with a registering device, of a main operating yoke, a crank handle and connections for operating the said yoke, auxiliary yokes operated by the main yoke, means for limiting the movements of the auxiliary yokes, a printing device including type carriers, and means connecting the respective auxiliary yokes to the type carriers.

8. In a cash register the combination with a registering device, of a main operating yoke, auxiliary yokes operated by the same, means for limiting the movements of said auxiliary yokes, a printer including a series of type carriers having driving pinions, and gear segments connected to the auxiliary yokes and meshing with said pinions.

9. In a cash register a main yoke, a series of auxiliary yokes operated thereby, graduated stop segments, means for limiting the movements of the segments, a printing mechanism moved proportionately with the segments, and means for positively coupling the auxiliary yokes and printing mechanism together during a certain period of their movements.

10. In a cash register, a main yoke, a series of auxiliary yokes operated thereby, graduated stop segments, means for limiting the movements of the segments, a registering device and a printing mechanism, both of which are operated proportionately with the segments, and means for coupling the printing mechanism and auxiliary yokes positively together during a portion of their movements.

11. In a cash register the combination with a main yoke, of a series of auxiliary yokes operated thereby, graduated stop segments, means for limiting the movements of the segments, indicating devices, and a printing mechanism, all of which are operated proportionately with the segments, and means for positively coupling the indicating devices and printing mechanism to the auxiliary yokes during a portion of their movements.

12. In a cash register the combination with a registering device, of a main yoke, a series of auxiliary yokes operated by the same, graduated stop segments connected to said auxiliary yokes, keys for limiting the movements of the segments, a printer including type carriers, and positive unyielding connecting means between the type carriers and their respective auxiliary yokes.

13. In a cash register of the class described the combination with a registering mechanism, comprising a plurality of registering wheels, of operating pawls for said wheels, a rotatable crank shaft, and movable locking means connecting the crank shaft with said pawls whereby they are left free to ride over the wheels during a portion of their movements but locked to said wheels during the remainder of their movements.

14. In a cash register the combination with a register comprising a series of wheels, of a series of operating pawls engaging said wheels, a rock frame which is adapted to engage said pawls and jam them into connection with the registering wheels to prevent overthrow, and movable means connecting said frame with the movable parts of the machine.

15. In a cash register the combination with a register comprising a series of wheels, of a series of operating pawls engaging said wheels, a rock frame, a series of noses mounted on said frame and arranged to engage and jam the pawls into engagement with said wheels, and means connecting said frame to the movable parts of the machine.

16. In a cash register the combination with a series of registering wheels, of movable members carrying operating pawls for said wheels, movable locking devices for said pawls mounted on said members so as to move therewith, and movable auxiliary locking devices for said pawls, operating independently of the first mentioned locking devices.

17. In a cash register the combination with a registering mechanism including a series of registering wheels, of operating levers, operating pawls mounted on said levers, bell crank locking levers mounted on the operating levers so as to engage the pawls and lock them to the registering wheels, and a movable tripping device so located as to always be in operative connection with the arms of the bell crank locking levers, no matter what positions the operating levers may take up.

18. In a cash register the combination with a series of registering wheels, of movable members carrying operating pawls for said wheels, locking devices for the pawls mounted upon the movable members, and having elongated extensions, and a rocking frame connected to the movable parts of the machine and arranged to engage the elongated extensions to operate the locking means, no matter what positions the movable members may have assumed.

19. In a cash register the combination with a series of registering wheels, of a series of registering levers, operating pawls mounted on the levers, locking devices for said pawls also mounted on the levers, means for operating the locking devices, and means independent of the levers for locking said pawls in engagement with the wheels.

20. In a cash register the combination with a series of registering wheels, of operating levers, pawls mounted on said levers and engaging said wheels, locking devices mounted on said levers and engaging the pawls for locking them to the wheels, means for operating the locking devices, and movable means independent of the levers for locking the operating pawls to the registering wheels.

21. In a cash register the combination with a series of registering wheels, of operating levers, pawls mounted on said levers and engaging said wheels, pivoted locking pawls also mounted on said levers and engaging the operating pawls to lock them to the wheels, movable means for operating the locking pawls, and movable devices independent of the operating levers, and arranged to engage the operating pawls to lock them to the registering wheels.

22. In a cash register the combination with a series of registering wheels, of operating levers, operating pawls mounted on said levers and engaging said wheels, movable locking devices mounted on the levers and engaging the pawls, means for operating said locking devices, and movable means independent of the first mentioned locking devices, arranged to engage the operating pawls to lock them to the registering wheels.

23. In a cash register the combination with a series of registering wheels, of a series of pivoted levers mounted on the axes of said wheels, operating pawls mounted on said levers locking pawls also mounted on the levers and having curved operating extensions which are approximately concentric to the fulcrum of the levers, and a movable device for operating said extensions, no matter what positions the levers may assume.

24. In a cash register of the class described the combination with a registering mechanism comprising a plurality of registering wheels, of pivoted levers, register operating pawls mounted on said levers, locking devices for said pawls also mounted on said levers, movable means adapted to be operated by the moving parts of the machine for actuating said locking devices, and means for independently turning the registering wheels to zero and also releasing the locking devices.

25. In a cash register of the class described, the combination with a registering mechanism, of operating levers, operating pawls mounted on said levers, locking devices for locking said pawls to the registering mechanism, a reset-to-zero mechanism adapted to operate said locking devices, and means for operating said locking devices without operating the reset mechanism.

26. In a cash register of the class described the combination with a register mechanism comprising a plurality of registering wheels, of operating pawls for the same, transferring pawls, devices for resetting the registering wheels simultaneously to zero, and means connected to said devices for rendering the transferring pawls inoperative.

27. In a cash register of the class described the combination with a registering mechanism comprising a plurality of registering wheels, of resetting levers for said wheels, hand levers, and springs connecting said hand levers and resetting levers.

28. In a cash register the combination with a register comprising a series of wheels, operating pawls for said wheels, means for operating said pawls, devices for locking said pawls to said wheels, and independent means for turning the wheels and simultaneously unlocking the operating pawls from the wheels.

29. In a cash register the combination with a register comprising a series of wheels, operating pawls for said wheels, locking devices for locking said pawls to said wheels, transfer pawls, devices for turning said wheels to zero, and means connected to said latter devices for releasing the operating pawls and disengaging the transfer pawls from the wheels.

30. In a cash register the combination with a register comprising a series of registering wheels, pivoted levers with provisions for picking up and returning the registering wheels to zero, springs secured to the respective levers, and a pivoted frame arranged to engage the free ends of all of said springs to put the same under tension.

31. In a cash register the combination with a register comprising a series of registering wheels, means for operating said wheels, rack teeth formed on said wheels, pawls engaging said rack teeth, levers carrying said pawls, a movable frame, and springs arranged to be operated by said frame and adapted to operate the respective levers.

32. In a cash register the combination with a register comprising a series of registering wheels, means for operating said wheels, rack teeth formed on said wheels, pivoted levers carrying pawls which engage said teeth, springs mounted on said levers, and means for simultaneously putting said springs under tension to operate said levers.

33. In a cash register the combination with a register comprising a series of wheels, of a frame movable independently of the regular movement of the machine, and a series of spring elements arranged to be moved simultaneously by said frame independent of the regular movement of the machine, and coöperating with said wheels to return them to zero.

34. In a cash register the combination with a series of registering wheels, of a pivoted member mounted on the axis of said registering wheels, and flexible means actuated by said member for simultaneously turning all of the registering wheels to zero.

35. In a cash register the combination with a series of registering wheels, of a pivoted member mounted on the axis of the registering wheels, and pivoted pawls arranged to independently operate the respective wheels, and flexible means connecting said pivoted member and pawls, whereby all of said pawls are simultaneously operated thereby.

36. In a cash register the combination with a series of registering wheels, of a pivoted member mounted on the axis of the registering wheels, pivoted pawls engaging the respective wheels and adapted to be simultaneously operated, and springs connecting the pawls and said member.

37. In a cash register the combination with a plurality of registering wheels, of means for operating said wheels, a movable member, and a series of spring pressed pawls arranged to be simultaneously operated by the said member and engaging the registering wheels to turn them to zero, so that one pawl may move after another has been arrested.

38. In a cash register the combination with a plurality of registering wheels, of means for operating said wheels, a movable member and a series of pivoted pawls common to and arranged to be simultaneously operated by said member to turn the register wheels to zero, the construction being such that one pawl may continue its movement after another has been arrested.

39. In a cash register the combination with a registering mechanism comprising a plurality of registering wheels, of means for operating said wheels, pivoted levers carrying pawls for turning said wheels to zero and hand operated devices flexibly and independently connected to said pivoted levers for simultaneously but independently actuating them so that one may continue its movement after another has been arrested.

40. In a cash register of the class described the combination with an operating mechanism of a registering mechanism, pawls for operating the latter, locking devices for said pawls, connected to the operating mechanism, and independent movable means for unlocking said locking devices independently of the regular operation of the machine.

41. In a cash register the combination with the registering wheels, of turn-to-zero devices for the same, operating pawls for said wheels, movable locking devices for said pawls and means for operating said locking devices to release the wheels so that they may be operated by the turn-to-zero devices.

42. In a cash register the combination with a series of registering wheels, of a movable member pivoted on the axis of said wheels, and a series of flexible independent devices operated simultaneously by the pivoted member to turn all the registering wheels to zero.

43. In a cash register of the class described the combination with a registering mechanism, of operating devices for the same, a curved lever for operating said devices, and a rotatable wheel having a projection adapted to engage the curved surface of said lever for moving it.

44. In a cash register the combination with a register comprising a plurality of registering wheels, operating levers carrying pawls engaging said wheels, a curved lever for operating said pawl carrying levers, a rotatable crank handle, and devices operated by said handle and engaging said curved lever to operate it.

45. In a cash register of the class described the combination with a plurality of keys, of a register, an operating lever for giving a complete operation to said register and a rotatable operating wheel having a projection adapted to strike said lever to operate the same.

46. In a cash register the combination with a register, of a main operating yoke, a curved lever connected to said yoke, and a rotatable operating wheel having a projection adapted to bear upon the curved surface of said lever for securing a movement of said lever only during a portion of its movement.

47. In a cash register the combination with a register of an operating handle, a series of keys, a lock for said handle controlled by said keys, and means for preventing any operation of the lock by the keys until a key has been fully depressed.

48. In a cash register the combination with a register, of a series of keys, a pivoted segment arranged to be operated by any of said keys, an operating handle, a handle stop, a lock for said stop, and means for transmitting the movements of the segment to the lock.

49. In a cash register the combination with a suitable frame, of a register, keys for controlling the same, an operating crank handle, an automatically movable stop for said handle mounted on the frame and arranged to be operated by said handle, a lock for said stop, and means connecting said keys and lock whereby the latter is operated by pressure upon the former to release the stop.

50. In a cash register the combination with a register, an operating handle and connections, register operating devices arranged to engage said connections and follow them because of their gravity, and means for arresting the handle if it should be moved faster than the operating devices can follow.

51. In a cash register the combination with a registering mechanism, of a main operating yoke, a series of register operating yokes arranged to be all operated by the main yoke, a crank handle, and gearing connecting said handle and the main operating yoke for reciprocating the latter upon the rotation of the handle.

52. In a cash register the combination with a registering mechanism, of a main operating yoke, a series of register operating yokes all arranged to be reset by the main yoke, a series of keys for limiting the independent movements of the registering yokes, a crank handle and gearing connecting said crank handle and main yoke.

53. In a cash register the combination with a registering mechanism, of transfer devices comprising a series of pawls and rock shafts connected to said pawls, an operating lever for said shafts, an operating crank handle, and gearing connecting said handle to the operating lever.

54. In a cash register the combination with a registering mechanism, of a series of auxiliary operating yokes, a main yoke, a rotary operating handle, and means intermediate said handle and main yoke for imparting only a part of the movements of the handle to said yoke.

55. In a cash register of the class described the combination with a registering mechanism, of a plurality of pivoted segments independently movable, a locking hook for each pair of said segments, a register operating device held by each of said hooks, keys adapted to operate said segments, and a locking arm mounted on one of each pair of segments and adapted to hold the locking hooks in place until the keys have been pressed in.

56. In a cash register of the class described the combination with a plurality of keys, of a registering mechanism, key segments, segmental stop segments, pivoted hooks for locking said stop segments, a spring arm mounted on each of said hooks and adapted to engage a projection on one of each pair of key segments, and arms mounted on said keys for locking said hooks in position.

57. In a cash register the combination with a register, of a series of keys, a segment and detent arranged to be operated by said keys, a register operating device, a locking hook for the same, actuating means connecting the segment to said hook, and a stop device for said hook connected to the detent.

58. In a cash register the combination with a register, of a series of keys, a detent for said keys, a segment arranged to be operated by said keys, register operating devices, a locking hook for said devices coöperating with the detent, and means for operating the hook through the medium of the segment.

59. In a cash register the combination with a register, of a series of keys, a register operating device, a segment arranged to be operated by any of said keys, a lock for the operating device arranged to be operated by said segment, an operating handle, a stop for the same, a lock for said stop, and means connecting the respective locks so that they will operate simultaneously.

60. In a cash register the combination with a series of keys, of a register, a key segment, an operating segment, a pivoted hook for locking said latter segment, and flexible means connecting the key segment and hook.

61. In a cash register the combination with a plurality of keys, of a register, a key segment, an operating segment, a pivoted hook for locking said latter segment, a spring arm mounted on said hook and adapted to engage a projection on the key segment, a detent and an arm mounted on said detent for locking said hook in position.

62. In a cash register the combination with a series of keys, of a detent and a key segment both arranged to be engaged and operated by said keys, an operating segment, a latch hook for said latter segment, a pin on the key segment, arranged to control the operation of the latch hook, and means mounted on the detent for preventing the movement of said hook.

63. In a cash register the combination with a series of keys, of detents for the same having beveled notched projections, said detents being elevated by the depression of a key and then tripped to lock the key in its depressed position, a series of operating elements, latches for said elements, and means for preventing the operation of the latches to release the operating elements until the detents have been dropped to latch the key in its depressed position.

64. In a cash register the combination with a series of keys having key pins, of a pivoted detent having beveled projections and locking notches with which the key pins coöperate, a series of operating elements, pivoted hooks for latching said elements in position arranged to automatically operate when released, and means for preventing the operation of the hooks until the keys have become latched to their detents.

65. In a cash register the combination with a series of keys, of pivoted detents for the same having beveled projections and locking notches, a series of key segments operated by the keys, a series of operating elements, pivoted hooks for latching said elements in position operated only when a key segment is operated, and means for preventing the operation of the hooks until the key detents have fully descended and latched the operated keys in depressed position.

66. In a cash register of the class described the combination with a registering mechanism, of a movable guard for the same, a latch for said guard, a rotatable crank shaft for operating the machine, and means for connecting the crank shaft and latch for releasing the latter near the end of the revolution of said crank shaft.

67. In a cash register of the class described the combination with a register, of a movable hand operated cover for the same, a latch for said cover for holding the same closed, a rotatable crank handle and latch for operating the machine, and means connecting the crank handle and latch for operating said latch at the last part of the revolution of the crank handle so that the cover may be opened and the registering wheels inspected or turned to zero at will.

68. In a cash register the combination with a register, of a movable guard for the same, a latch for said guard and means permanently connecting the latch with the moving parts of the machine so that said guard cannot be opened until a predetermined period in the operation has been reached.

69. In a cash register of the class described, the combination with a registering mechanism, of an operating crank handle, a spring pressed plunger mounted on the frame and adapted to form a stop for said handle and to be operated by the latter when released, and means connected to the moving parts of the machine for locking said plunger.

70. In a cash register of the class described the combination with a registering mechanism, of a plurality of operating yokes, a plurality of hook arms adapted to engage said yokes respectively, and a main operating yoke carrying an arm adapted to simultaneously trip all of said hook arms.

71. In a cash register the combination with a register, of keys, an operating crank handle, an automatic plunger stop arranged to project into the path of said handle and to be forced back by the latter when free, a lock for said stop, and means connecting said keys and lock whereby the latter is operated by pressure upon the former to release the plunger.

72. In a cash register the combination with a register, of a series of auxiliary operating yokes, a main operating yoke, a series of latching levers for holding said auxiliary yokes in their elevated positions, and a tripping means mounted on said main yoke and arranged to disengage the levers from the auxiliary yokes.

73. In a cash register the combination with a register, of a series of keys, a series of detents for locking said keys in their depressed positions, an operating shaft carrying a cam, and a frame arranged to be operated by said cam, so as to simultaneously lift all of said detents.

74. In a cash register the combination with a series of keys, of detents for the same, a frame comprising a plurality of links which are pivotally connected to the respective detents, and means connecting said frame to a movable part of the machine whereby the said detents are simultaneously operated to release the keys.

75. In a cash register the combination with a series of registering elements, of devices for turning the same to zero, movable means for arresting the registering elements at the zero positions and a latch for the turn to zero devices, operated by said arresting means.

76. In a cash register, the combination with registering ratchet wheels, normally advanced pawl-carrying arms whose pawls engage said wheels, and differential mechanism for operating said arms; of curved pawl-locking arms and a movable frame common to the same, said arms preserving coöperative relation between the frame and the pawls throughout the range of movement of the latter; together with means controlling said frame to keep the pawls normally locked to the ratchet wheels but release the same to permit their retreat over the ratchet wheels in obedience to the action of the differential mechanism and then to effect a relocking for the return stroke, substantially as described.

77. In a cash register, the combination with a register, of a series of auxiliary yokes for driving said register, a main yoke surrounding said auxiliary yokes, and constructed to operate them, arms constructed to latch said auxiliary yokes separately in their normal positions, and connections from said main yoke for disabling said latch arms.

78. In a cash register, the combination with a series of registering wheels, of a series of auxiliary yokes, operating levers for said wheels mounted on said yokes, a main yoke surrounding said auxiliary yokes and normally supporting said yokes, a series of arms constructed to latch said auxiliary yokes in their normal positions, and a projection from said main yoke having connections to release said latching arms and thereby permit movement of said auxiliary yokes.

79. In a cash register, the combination with a main operating mechanism including a driving crank, of a spring-pressed plunger for locking said crank against operation, an element holding said plunger against releasing movement, and a bank of keys having connections to withdraw said holding element.

In testimony whereof I affix my signature, in presence of two witnesses.

JOHN H. McCORMICK.

Witnesses:
WM. H. MUZZY,
IRA BERKSTRESSEN.

Copies of this patent may be obtained for five cents each, by addressing the "Commissioner of Patents, Washington, D. C."